United States Patent [19]
Oberst et al.

[11] Patent Number: 5,802,853
[45] Date of Patent: Sep. 8, 1998

[54] VALVE HOUSING ASSEMBLY FOR A BRAKE VALVE

[75] Inventors: Karsten Oberst, Ludwigshafen; Harald Winkelmann, Seeheim-Jugenheim, both of Germany

[73] Assignee: Deere & Company, Moline, Ill.

[21] Appl. No.: 844,812

[22] Filed: Apr. 22, 1997

[30] Foreign Application Priority Data

May 8, 1996 [DE] Germany .................. 196 18 429.0

[51] Int. Cl.⁶ .................................................. F15B 7/00
[52] U.S. Cl. ............................... 60/581; 60/583; 60/585
[58] Field of Search ........................... 60/533, 581, 582, 60/583, 585

[56] References Cited

U.S. PATENT DOCUMENTS

| | | | |
|---|---|---|---|
| 3,675,422 | 7/1972 | Drutchas et al. | 60/582 X |
| 4,248,045 | 2/1981 | Turner | 60/583 X |
| 4,779,422 | 10/1988 | Brown | 60/582 X |
| 5,239,828 | 8/1993 | Gawlick | 60/581 |
| 5,261,235 | 11/1993 | Shellhause | 60/581 |

FOREIGN PATENT DOCUMENTS

| | | |
|---|---|---|
| A-2419010 | 4/1973 | Germany . |
| A-4132245A1 | 4/1993 | Germany . |

*Primary Examiner*—Hoang Nguyen

[57] ABSTRACT

A two-stage brake valve includes a valve housing. The valve housing contains a chamber, one side of which serves as an equalizing reservoir which is connected directly or indirectly with at least one brake cylinder bore which is formed in the valve housing. The other side of the chamber forms an emergency steering volume for a hydrostatic steering circuit. A return line of the hydrostatic steering circuit opens into the chamber and an overflow opening communicates an upper region of the chamber through a channel to a fluid reservoir. To prevent foaming brake fluid from reaching the brake circuit, an intermediate wall separates the equalizing reservoir from the emergency steering volume. The equalizing reservoir and the emergency steering volume are connected to each other via an equalizing opening.

14 Claims, 3 Drawing Sheets

VALVE HOUSING ASSEMBLY FOR A BRAKE VALVE

BACKGROUND OF THE INVENTION

The invention concerns the valve housing for a vehicle brake valve, preferably for a two-stage brake valve. The valve housing contains a chamber that is used on the one hand as equalizing reservoir which is connected directly or indirectly with at least one brake cylinder bore provided in the valve housing, and is used on the other hand as the emergency steering volume of a hydrostatic steering circuit, where at least one return line of the hydrostatic steering circuit ends in the chamber and that an overflow opening is provided in a higher location in the chamber, which is connected through a channel with a reservoir for hydraulic fluid. Furthermore the invention concerns an intermediate wall for such a valve housing.

DE-A41 32 245 describes a two-stage brake valve that is provided with two cross sectional steps whose effective cross sections become operational in succession, in which the larger effective cross section is used initially to fill the brake cylinders and then, after a transitional phase, the smaller effective cross section is applied exclusively to generate the required brake pressure. The pressure chambers of the large and the small effective cross section are connected through valve means with an equalizing reservoir. On the one hand the equalizing reservoir supplies the pressure chambers with sufficient brake fluid and accepts the brake fluid displaced from the pressure chambers during braking. On the other hand the equalizing reservoir may be used as a supply reservoir for brake fluid lost through leakage. The brake fluid should be as free as possible from air bubbles in order to assure a stable pressure level for the brakes and to avoid any increase in the stopping distance.

Brake valves of this type are applied to John Deere 6000 series tractors. Here the brake valve is integrated into the hydraulic system of the vehicle, which also includes the hydraulic steering circuit. The hydraulic fluid of the hydraulic system is used as brake fluid. A chamber of the brake valve is used as equalizing reservoir and is connected to the steering circuit in such a way that the chamber can be used simultaneously as emergency steering volume for the hydraulic steering. Such an emergency steering volume is necessary for safety reasons, in order to make possible some resupply of hydraulic fluid for manual emergency operation of the steering cylinders in case of a failure of the hydraulic pump, and, if necessary, to equalize leakage and non-uniformities of the steering geometry.

The integration of the equalizing reservoir associated with the brake valve together with the emergency steering volume in a single chamber of the brake valve has advantages since neither a separate container for the emergency steering volume nor a separate, special brake fluid is required. Furthermore temperature equalization between the steering circuit and the brake circuit takes place. This is advantageous since the fluid in the steering circuit rapidly reaches its operating temperature during operation of the vehicle. The heating of the steering circuit is transmitted directly to the brake circuit. Thereby the viscosity of the hydraulic fluid in the region of the brake valve can be lowered rapidly, particularly when a cold vehicle is put into operation, in order to assure reliable operation of the brake circuit.

Since the hydraulic fluid in the steering circuit is constantly being recirculated, the hydraulic fluid from the steering circuit entering the common chamber for the equalizing reservoir and the emergency steering volume may be subject to foaming, that is, interspersed with air bubbles. However, as mentioned above, fluid with excessive foaming may be detrimental to brake performance.

SUMMARY OF THE INVENTION

An object of the present invention is to provide a valve housing of the class noted in such a way that the aforementioned problems are overcome.

In particular, an object of the present invention is to avoid foaming of brake or hydraulic fluid introduced into the brake circuit, particularly into the brake cylinder bore of the brake valve and into the brake cylinders.

These and other objects are achieved by the present invention, wherein the chamber is subdivided by means of a fluid flow guide vane or by an intermediate wall into an equalizing reservoir and an emergency steering volume. Thereby the steering circuit and the brake circuit are largely separated from one another. Nevertheless, the equalizing reservoir and the emergency steering volume, both of which are integrated into the brake valve, are connected to each other by at least one equalizing opening. The equalizing reservoir is located at a lower level or underneath the emergency steering volume, so that quiescent hydraulic fluid, free from air, can collect in the equalizing reservoir, which is not disturbed by fluid flows interspersed with air bubbles in the emergency steering volume.

The intermediate wall that subdivides the chamber can be designed relatively thin and thereby permits a rapid temperature equalization between the region serving as equalizing reservoir and the region of the chamber serving as emergency steering volume.

Furthermore, the equalizing opening, is preferably configured as a penetration opening in the intermediate wall, and permits pressure equalization between the equalizing reservoir and the emergency steering volume as well as a fluid interchange during temperature variations (thermal expansion) and leakage losses in the brake circuit. The automatic resupply of fluid results in a maintenance-free brake system. The dimensions and the choice of location of the penetration opening can easily be selected in such a way that the transfer of hydraulic fluid subject to foaming of the steering return flow, in particular a transfer from the emergency steering volume into the equalizing reservoir can be largely avoided.

The intermediate wall is preferably a formed plastic component of constant thickness. The surrounding rim region of the intermediate wall is generally plane and can be clamped between flange surfaces of the valve housing body and a cover. In a preferred embodiment of the invention, the central region of the intermediate wall is curved inwardly and downwardly, which intrudes at least partially into the chamber of the valve housing and subdivides this into an equalizing reservoir and an emergency steering volume.

In order for the intermediate wall to conform as much as possible with the fluid flows, it has an asymmetric cross section wherein on one side the curved portion inclines or dips relatively steeply and on the opposite side the curved portion inclines or dips relatively gradually. The cross section is preferably streamlined. On the steep side a tube-shaped spigot formed by the cover extends into the curved portion and forms with its lower end the return opening of the hydrostatic steering circuit. In the opposite flat rim region that is preferably located at a higher level, that is adjacent to the gradually inclined region of the curved portion, the intermediate wall is provided with a penetration opening which is aligned with the overflow opening connected to the reservoir. The streamline shape of the intermediate wall permits the hydraulic fluid from the steering circuit to be guided along a relatively long circular path from the return opening to the overflow opening, which avoids turbulence. An undesirable impact pressure at the overflow opening can be avoided by a sufficiently large dimensioned cross section of the channel leading to the reservoir.

Preferably, the valve housing has a housing body which is provided with a depressed chamber which is open to the outside and that can be closed by a cover. A surrounding generally plane rim region of the pan-shaped intermediate wall can be clamped between the flange surfaces of the housing body and of the cover.

The valve housing can be sealed by a surrounding seal ring (O-ring) in the rim region of the intermediate wall against the flange surface of the housing body and/or the flange surface of the cover. The seal rings can be accommodated in surrounding grooves in the housing body, the cover and/or the intermediate wall.

In order to determine, after installation of the valve housing, whether the intermediate wall was installed or that its installation was possibly forgotten, it is advantageous that the valve housing and the rim region of the intermediate wall be designed in such a way that the rim region is visible from the outside, at least in some regions, when the valve housing is assembled.

It is advantageous that the return opening of the hydrostatic steering circuit be submerged into the hydraulic fluid in the emergency steering volume, in order to draw hydraulic fluid by suction from the emergency steering volume during emergency steering operation. For this purpose a spigot is formed onto the cover which extends into the lower region of the curved portion of the intermediate wall. The return line of the hydrostatic steering circuit ends at the lower end of the spigot.

Furthermore, a recess or curved portion can be provided in the cover that is located above the equalizing opening and/or the penetration opening and that eases the flow of hydraulic fluid transferring from the emergency steering volume into the overflow opening and/or the equalizing opening.

Furthermore, the valve housing has an intermediate wall with a generally uniform wall thickness. The intermediate wall contains a surrounding plane rim region that encloses at least one pan-shaped curved portion. Such an intermediate wall can be retrofitted to great advantage in known valve housing bodies of the aforementioned type, in order to attain the noted advantages in these cases also.

The intermediate wall is preferably provided with the characteristics already described in connection with the valve body. It may be configured as a metallic plate that possesses good heat transfer for the heat exchange. However, there is a particular advantage in producing the intermediate wall at low cost from a relatively light plastic, that is sufficiently strong for the attaching requirements and that can withstand environmental influences, for example, Polyamide 6–30% glass fiber reinforce, that can be manufactured by injection molding.

DETAILED DESCRIPTION

Figure 1:
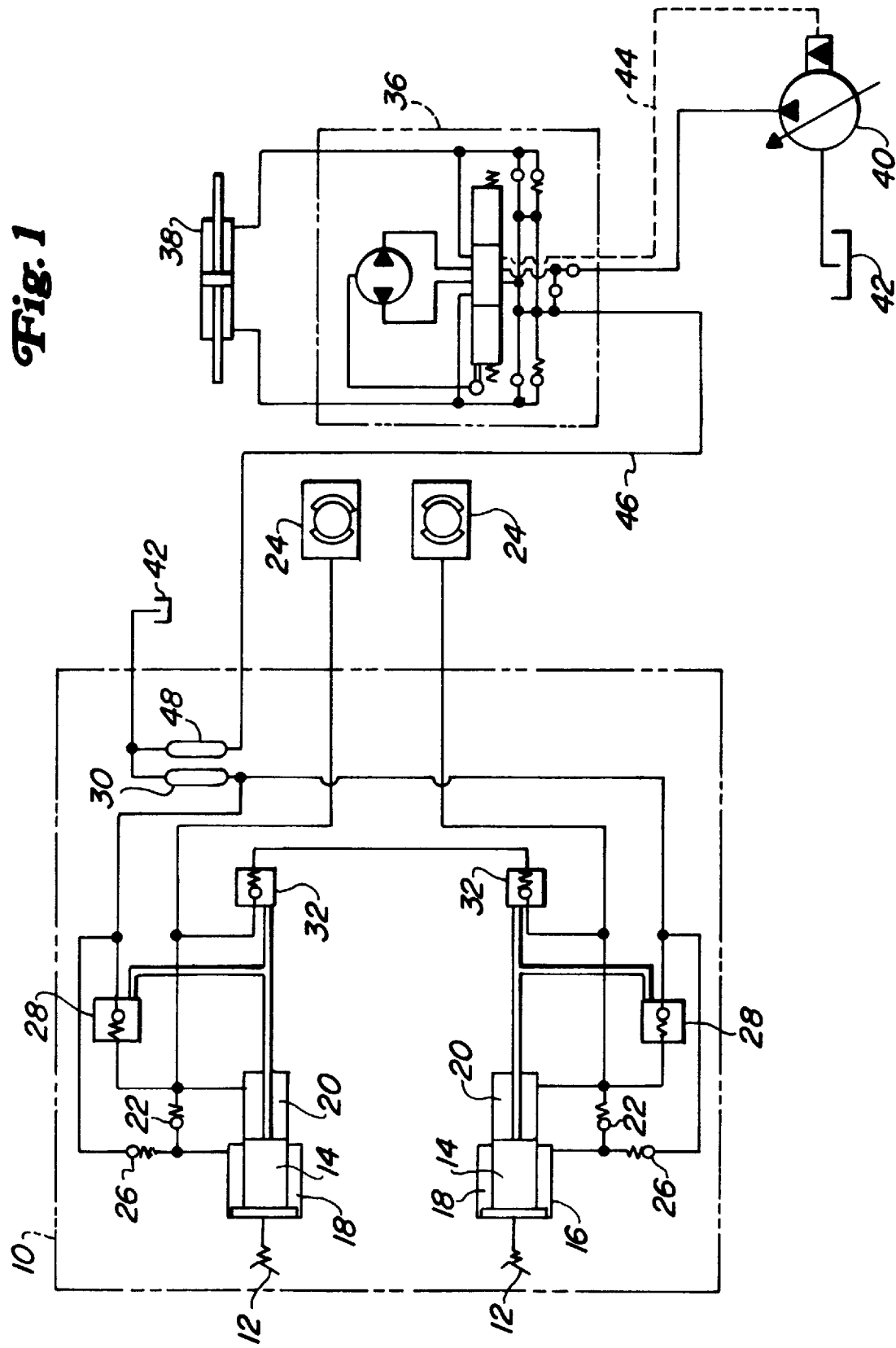
FIG. 1 shows a simplified, schematic illustration of hydraulic braking and steering circuit according to the present invention.

FIG. 1 shows schematically a hydraulic braking and steering circuit. The left side of FIG. 1 shows the brake circuit 10, in which a left and a right brake pedal 12 each act upon the stepped piston 14 of an associated two-stage brake valve. When a brake pedal 12 is actuated the associated stepped piston 14 is moved within its brake cylinder bore 16. The brake cylinder bore 16 is also stepped and is provided with a section of large diameter and a section of smaller diameter, so as to develop a fill stage 18 and a pressure stage 20. The fill stage 18 is connected through a check valve 22 and the pressure stage 20 is connected directly to the associated brake cylinder 24. The check valve 22 controls the shift between the fill stage and the pressure stage. Furthermore, the fill stage 18 is connected by a feed valve 26 and the pressure stage 20 over a tilt or inlet valve 28 with an equalizing reservoir 30. In addition, the pressure stage 20 is connected to a pressure equalizing valve 32 which, in turn, is connected to a corresponding pressure equalizing valve 32 of the other brake valve and is used to equalize pressure between the left and the right brake as long as both brake pedals 12 are actuated. If only one brake pedal 12 is actuated (steering braking), pressure equalization between the left and the right brake does not take place. The inlet valve 28 and the pressure equalizing valve 32 can be controlled mechanically by the stepped pistons 14 as is indicated in FIG. 1 by double lines. Details of such a brake circuit 10 are explained in greater detail in DE-A-41 32 245, which is hereby incorporate by reference.

A series of valves are integrated into a hydraulic steering valve 36 on the right side of FIG. 1. The steering valve 36 is used to control a steering cylinder 38. Steering valves of this type are known, so that they are not described any further at this point. The steering valve 36 is supplied by a hydraulic pump 40 that draws hydraulic fluid from a reservoir 42. The hydraulic pump 40 is controlled through a control line 44 from the steering valve 36. The steering valve 36 is connected through a return line 46 with an emergency steering volume 48. According to the state of the art, the equalizing reservoir 30 and the emergency steering volume 48 are combined in a single chamber 50 provided in the brake valve 10 and connected to a reservoir 42.

The equalizing reservoir 30 and the emergency steering volume 48 are separated by an intermediate wall 52 which will be described in greater detail.

Figure 3:
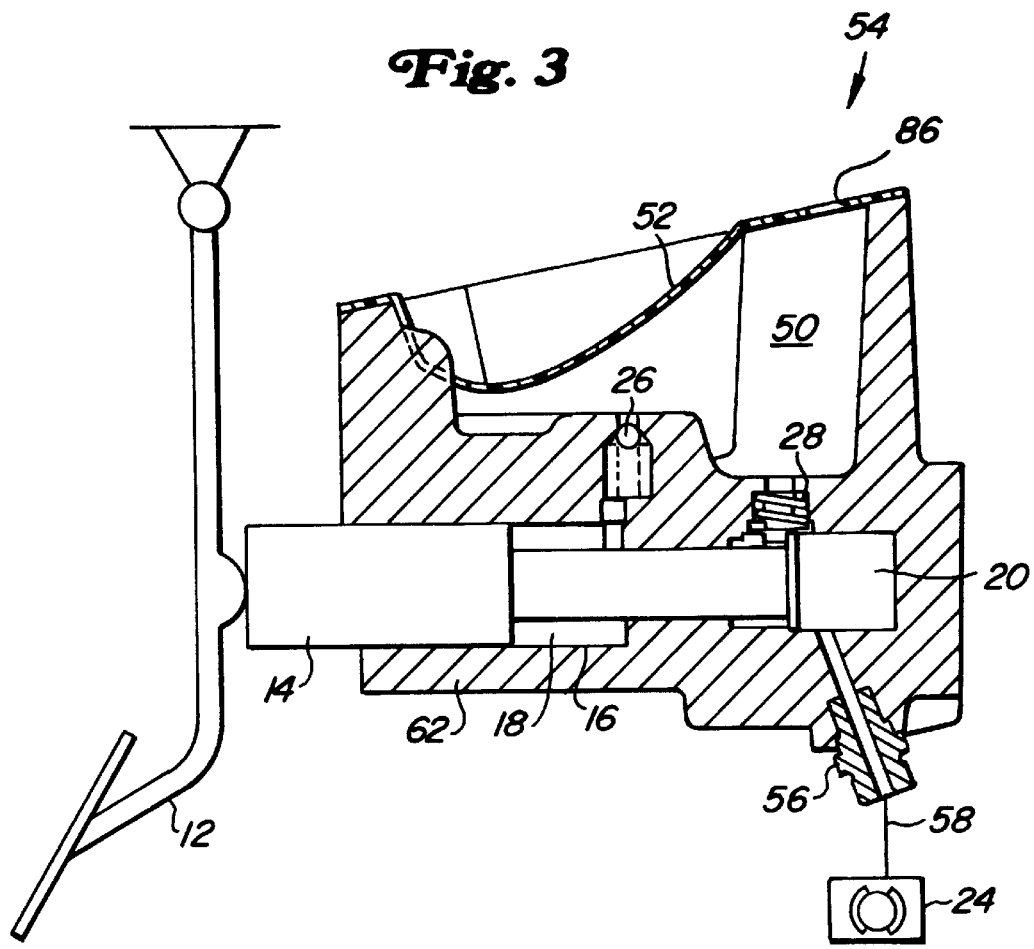
FIG. 3 is a cross sectional view along lines III—III of FIG. 2.

FIG. 3 shows a brake pedal 12, a stepped piston 14 which is guided, axially movable, in a stepped bore 16, a feed valve 26, a inlet valve 28 and a connecting device 56 which connects the pressure stage 20 through a brake line 58 with a brake cylinder 24. The feed valve 26 connects the fill stage 18 and the inlet valve 28 connects the pressure stage 20 with a chamber 50 provided in the valve housing 54 and that is open upward. The chamber 50 can be closed by a cover 60, which is not shown in FIG. 3. An intermediate wall 52 is clamped between the valve housing 54 and the cover 60 and shall be described in greater detail on the basis of FIG. 4.

Figure 4:
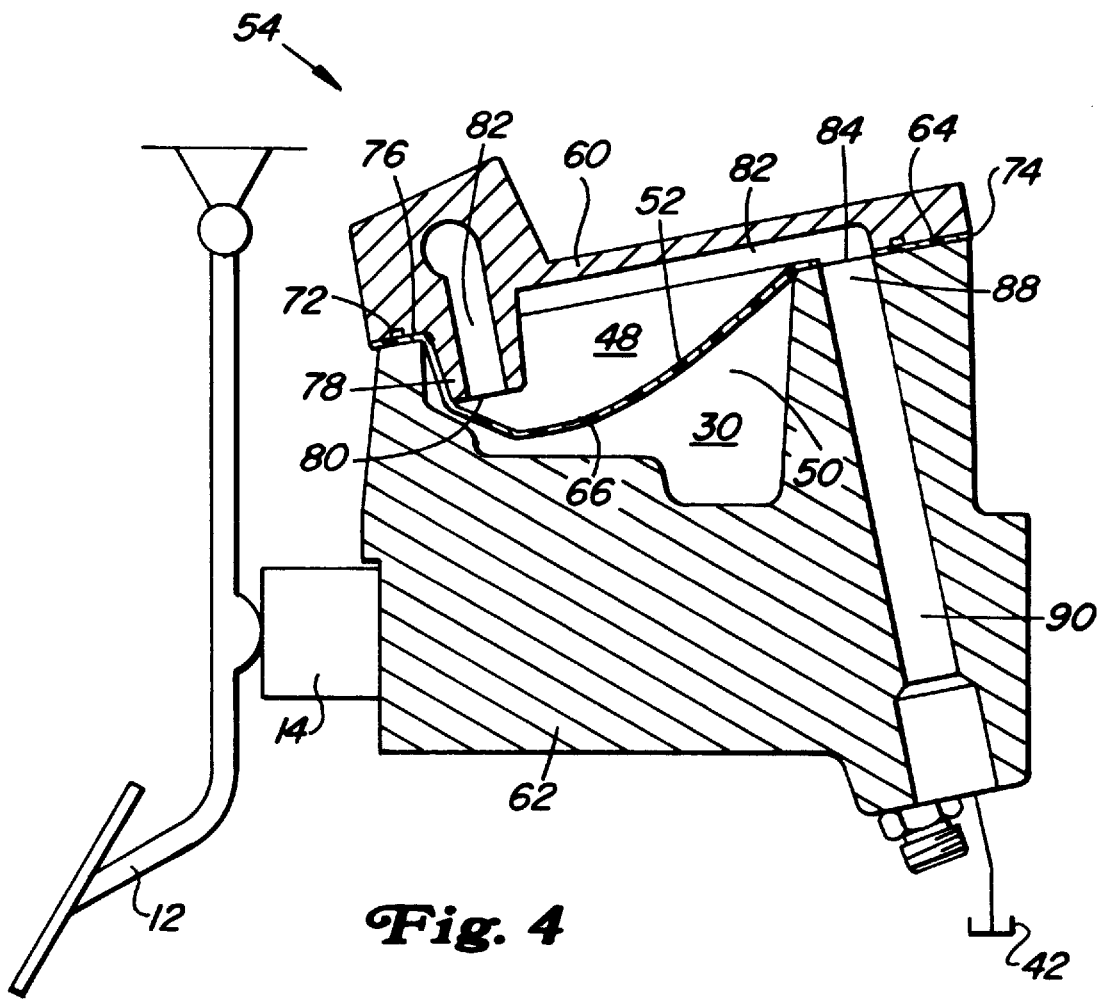
FIG. 4 is a cross sectional view along lines IV—IV of FIG. 2, but with a cover.

Referring now to FIG. 4, the chamber 50 in the housing body 62 can be closed by a cover 60 and is subdivided by an intermediate wall 52 into two partial chambers. These partial chambers are the equalizing reservoir 30 and the emergency steering volume 48.

Figure 2:
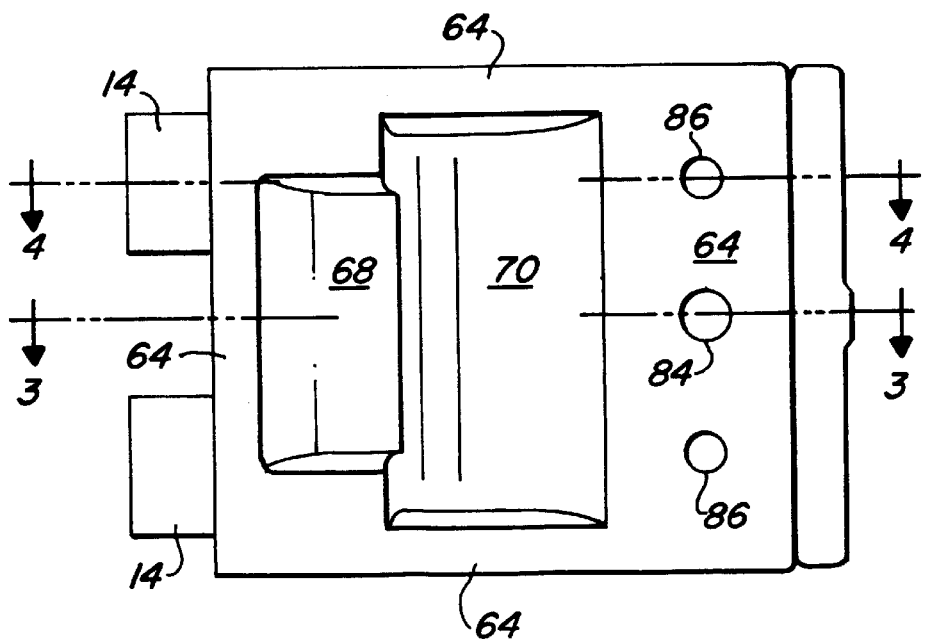
FIG. 2 is a front view of the valve housing of FIG. 1.

The intermediate wall 52 consists of a plastic component with generally constant wall thickness. It contains a generally plane surrounding rim region 64 that encloses a pan-shaped curved portion 66. As can be seen in FIG. 2, the curved portion 66 contains two sections 68, 70 of varying with, which is due entirely to the complex configuration of the valve housing and does not basically affect the operation of the intermediate wall 52.

The rim region 64 of the intermediate wall 52 lies in a plane that is in contact with the flange surface of the housing body 62 and is inclined to the horizontal. It is covered by a flange surface of the cover 60 that can be attached by means of screws, not shown, to the housing body 62. In order to seal the intermediate wall 52 against the housing body 62, the intermediate wall 52 is provided in its rim region 64 with a surrounding groove, not shown, that is open downward into which a sealing ring, not shown, is inserted. For the sealing of the cover 60 against the intermediate wall 52, a surrounding groove 72 is provided on the underside of the cover 60, into which a sealing ring is inserted. The surrounding end face of the rim region 64 of the intermediate wall is visible from the outside when the valve housing 54 is assembled, for example, at the location 74.

The cross section of the intermediate wall 52, in particular its curved portion 66 is configured asymmetrically. From the deeper rim side 76, at left in FIG. 3 or 4, the intermediate wall 52 drops off steeply, while on its opposite, somewhat higher rim side it blends in a circular arc relatively flat into the rim region 64. The cross section of the curved portion 66 is generally similar to a streamline shape.

In the steeply inclined region of the curved portion 66 a tube-shaped spigot 78 that is formed onto the cover 60, extends into the deepest part of the curved portion 66 of the intermediate wall 52. The lower end of the spigot 78 is provided with a return port 80 that is connected through a return channel 82 integrated into the cover 60 with the return line 46 of the steering valve 36. Since hydraulic fluid collects in the curved portion (emergency steering volume) and therefore the curved portion is always partially filled with hydraulic fluid, the return port 80 is submerged in hydraulic fluid. In case of failure of the hydraulic pump 40, this assures that when the steering cylinder 38 is operated manually, hydraulic fluid is drawn by suction through the return line 46, the return channel 82 and the return port 80 from the emergency steering volume 48 into the steering valve 36.

In the plane rim region 64 located at a higher level (at right in FIG. 3 and 4) of the intermediate wall 52 a central penetration opening 84 is provided and an equalizing opening 86 each to the right and the left thereof. All three openings 84, 86 are aligned with each other. The openings 84, 86 are located at such a high level that they operate as overflow openings. The penetration opening 84 is located above an overflow opening 88 in the housing body 62 which is connected through a channel 90 with the reservoir 42. If the fluid level in the emergency steering volume 48 rises, the hydraulic fluid can flow through the penetration opening 84, the overflow opening 88 and the channel 90 into the reservoir 42. Hydraulic fluid can flow through the two equalizing openings 86 from the emergency steering column 48 into the equalizing reservoir 30 of the brake valve, so that the equalizing reservoir 30 is always automatically filled, in case a loss of fluid should occur. The equalizing openings 86 are dimensioned in such a way that there is no noticeable build up of pressure in the equalizing reservoir 30 of the brake circuit. To avoid closing the penetration opening 84 and the equalizing openings 86 by the cover 60, the cover 60 is provided on its underside with at least one recess 92 that is located above the openings 84, 86.

During operation hydraulic fluid interspersed with air flows constantly out of the return port 80 into the emergency steering volume 48. This flows along the streamline shape of the intermediate wall 52 to the penetration opening 84 and flows through the channel 90 into the reservoir 42. The hydraulic fluid also flows through the equalizing opening 86. In case the equalizing reservoir 30 is not completely filled, this is topped off. Since there is no significant fluid flow in the equalizing reservoir 30, the hydraulic fluid can stop flowing and rest here so that any remaining air bubbles it contains can escape upward through the equalizing opening 86.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A valve housing for a vehicle brake valve having a chamber, one side of the chamber serving as an equalizing reservoir which is connected directly or indirectly with at least one brake cylinder bore formed in the valve housing, another side of the chamber serving as an emergency steering volume of a hydrostatic steering circuit, the steering circuit having at least one return port opening into the chamber, the chamber having an overflow opening above the return port, the overflow opening being connected through a channel with a fluid reservoir, characterized by:

an intermediate wall which subdivides the chamber into the equalizing reservoir and the emergency steering volume; and at least one equalizing opening which communicates the equalizing reservoir with the emergency steering volume.

2. The valve housing of claim 1, wherein:

the equalizing opening is a penetration opening formed in the intermediate wall.

3. The valve housing of claim 1, wherein:

the intermediate wall having a planar rim having a substantially uniform thickness and a central curved portion which extends into the chamber.

4. The valve housing of claim 3, wherein:

the intermediate wall has an asymmetrical cross section wherein from one side of the rim the central curved portion dips relatively steeply into the chamber and from an opposite side of the rim the central curved portion dips relatively gradually into the chamber.

5. The valve housing of claim 3, wherein:

a penetration opening extends through an upper portion of the rim, the penetration opening being communicated with the reservoir via the overflow opening.

6. The valve housing of claim 1, wherein:

the equalizing opening is located in an upper portion of the intermediate wall and is spaced apart from the return port.

7. The valve housing of claim 3, wherein:

the equalizing opening is located in an upper portion of the rim.

8. The valve housing of claim 3, wherein:

the valve housing comprises a housing body which forms the chamber; and a cover for closing the chamber, the rim of the intermediate wall being clamped between the housing body and the cover.

9. The valve housing of claim 8, wherein:

portions of the rim are exposed to the environment when the valve housing is assembled.

10. The valve housing of claim 8, wherein:

a sealing ring is located between the rim and the housing body or between the rim and the cover.

11. The valve housing of claim 8, wherein:

the cover forms a stem which projects into a lower portion of the central curved portion of the intermediate wall, the return port being formed in an end of the stem.

12. The valve housing of claim 8, wherein:

the cover has a recess formed therein, the recess being communicated with the equalizing opening and the overflow opening.

13. The valve housing of claim 4, wherein:

the overflow opening and the equalizing opening are located in a part of the rim which is adjacent to the portion of the central curved portion which dips relatively gradually into the chamber.

14. The valve housing of claim 1, wherein:

the intermediate wall is manufactured from plastic by the injection molding process.

* * * * *